Patented Mar. 14, 1933

1,901,434

UNITED STATES PATENT OFFICE

ARTHUR R. CADE AND HALVOR O. HALVORSON, OF MINNEAPOLIS, MINNESOTA

GERMICIDAL AND DETERGENT SUBSTANCES

No Drawing. Application filed October 15, 1928. Serial No. 312,742.

This invention relates generally to the production of substances having germicidal properties, and also specifically relates to the production of a substance and/or a series of substances having germicidal and detergent properties.

The invention is broadly based on the discovery that, although certain substances when used separately and in certain concentrations, do not exhibit germicidal properties, these same substances do exhibit such properties when combined in certain proportions with small quantities of soaps of unsaturated chemical compounds. The invention is also based on the discovery that, although alkaline substances in solution or otherwise, when used alone in certain concentrations are not efficient as germicides, these substances are made germicidally efficient in varying degrees up to the highest required efficiency, and at low concentrations, by the addition of a soap or soaps of certain unsaturated chemical substances (such for example as the soaps of the fatty acids) and by the use of kindred substances with kindred unsaturated chemical compound.

The terms "germicide", "antiseptic", and "sterilization", as used herein are meant to be synonymous, and referring to actual killing, as distinguished from mere inactivation.

In order to understand the gains in this art, accruing from the use of the substances included in the present discovery, a discussion of current methods of washing and sterilization, as well as a partial enumeration of substances commonly used, is necessary.

There are two main classes of washing powers, viz: Those which contain sodium phosphate as a base, and those which contain mixtures of caustic soda and sodium carbonate.

These substances are not dependably germicidal, even in those high concentrations which are harmful to the skin, and which are therefore objectionable for many commercial uses.

Among other commercial cleansers are those which contain not only alkaline phosphates, but added ingredients such, for example, as ammonium chloride as a cleansing aid, and these are also objectionable for reasons given above.

The mechanical washing of bottles and other containers, used in beverage and dairy industries, is common. The composition of the solutions, the temperature, and the time of contact, are all factors which vary with the particular method of washing, and therefore the processes are complicated, and expensive. It has been found that mere washing does not sterilize the vessels, and that it is necessary to pass them through other solutions, or to steam or bake them, in order to kill or even partly kill the micro-organisms, an additional complication.

For many years, it was assumed that no additional treatment after washing with ordinary washing compounds, was necessary in order to obtain sterilization, but it has been found necessary, and regulations have been passed requiring the containers to be given the proper additional treatment.

A few substances which have been used, in addition to the above mentioned substances, are chlorine compounds, such as sodium hypochlorite, hypochlorous acid, bleaching powders, etc. A definite available chlorine content has been the standard requirement for compounds of this class. These hypochlorite compounds have the disadvantage of being less effective as their temperature is increased. Moreover, their germicidal action is markedly reduced in the presence of organic matter, such as exists in dirty bottles.

Hypochlorites per se, having the available chlorine strength usually recommended do not kill tubercle bacilli present in milk bottles. The chlorine antiseptics in general, particularly of hypochlorite type exert this disinfectant action over an exceedingly short period of time. This shows the unreliable results when using chlorine compounds for bottle washing and sterilization, because the wash water is always heavily loaded with organic matter, present as impurities and as old milk.

When the steaming process is used, it is necessary to gradually cool glass containers, milk bottles for example, to prevent breakage, and also to bring them to a temperature which will not be injurious to the liquids subsequently introduced. All operations where the temperature of the compound or of the container is considerably raised, are objectionable either for the fact that cleaning compounds are decomposed or that the containers must be cooled in stages. All the present processes are therefore time-consuming and much re-handling is necessary.

The present invention also eliminates the necessity for the use of two solutions which must be mixed before application, and provides efficient germicidal and cleansing action. In addition, the substances herein claimed have no objectionable odor, and are stable in the presence of organic matter. Moreover, only a single treatment or washing of the containers is necessary, and this single washing can be made at a temperature approximately 50° C., at which temperature no cooling is necessary to prevent breakage on glass containers, or to avoid an objectionable change in a beverage placed in the containers, directly after treatment.

In carrying out the invention a solution of an alkali having a given concentration of pH is selected (which is not germicidal, or which is weakly germicidal), and to this is added a given quantity by weight of a soap of an unsaturated chemical compound, (such as sodium oleate). The result of this addition is that the alkali solution is either made germicidal, or its germicidal action is substantially increased.

Experiments have been carried out using alkali solutions of various concentrations, to which have been added varying quantities of the soaps of unsaturated chemical compounds, and it has been found that in every case the germicidal action of a given alkaline solution is increased by the simple addition of a small quantity of the soap (such as sodium oleate or equivalent unsaturated compound) within the range of .0005% to 5.0% by weight.

Applying the following method, namely a modified Reddish method for determining germicidal power, (within the meaning of the Pure Food and Drug Act) results were obtained, a few of which are indicated in the tables below. The insecticide board strain of *Staphylococcus aureus*, (which meets the requirements demanded by the bureau of chemistry of the United States Department of Agriculture) was used, this strain being capable of resisting a solution of 1-70 phenol at 37° C. for ten minutes, or 1-80 solution of phenol for fifteen minutes. A twenty-four hour broth culture was used, the culture having been grown for at least five consecutive days, that is transferred daily. The culture broth and agar medium was of the composition required by the Reddish method.

The procedure was as follows: 5 cc of the solution to be tested were placed in a test tube which was in turn placed in a water bath and maintained at a temperature of 37° C. for at least five minutes. .5 cc. of the culture of bacteria (containing approximately fifty million bacteria per cc) were then added to this solution, and then the solution was allowed to stand at 37° C. for exactly five minutes. A standard loopful (approximately 0.01 cc) was then withdrawn and thoroughly mixed in a test tube of agar, melted and cooled to 45° C. This mixture was then poured into a petri dish and allowed to cool. The mix was then incubated at 37° C. for forty-eight hours, and the colonies were counted.

This colony count showed the number of bacteria present in the solution, being treated for antiseptic value, that is the amount of bacteria, if any, in a standard loopful of 0.01 cc. The count, if no antiseptic action had taken place, was approximately six hundred thousand per loopful.

Although it is not practicable to set forth herein, the results of the hundreds of experiments performed by us, the results of a sufficient number are given in the following tables to show that the addition of a small quantity of a soap of an unsaturated compound, to an alkaline solution will increase, frequently enormously increase, the germicidal action of the solution. It is therefore the intention to claim all the substances having germicidal properties obtained by the addition of a soap of an unsaturated compound, to an alkali solution, and to claim all possible combinations of alkaline concentrations within the pH range of 7 to 14, with soaps of unsaturated compounds in quantities ranging from .0005% to 5% of the soap by weight.

*Table I*

| pH | Alkali used | Soap used | Amount | Count | Count with pH alone; no soap |
|---|---|---|---|---|---|
| 7.0 | None | None | | 640,000 | 640,000 |
| 7.8 | None | Sodium oleate | 0.1% | 32,000 | 580,000 |
| 8.4 | Na$_2$HPO$_4$ | Sodium oleate | 0.1% | 12,000 | 520,000 |
| 8.8 | Na$_2$HPO$_4$ | Sodium oleate | 0.1% | 7,200 | 400,000 |
| 9.9 | Na$_2$HPO$_4$ and Na$_3$PO$_4$ | Sodium oleate | 0.1% | 3,600 | |
| 10.9 | Na$_2$HPO$_4$ and Na$_3$PO$_4$ | Sodium oleate | 0.1% | 70 | |
| 11.9 | Na$_3$PO$_4$ | Sodium oleate | 0.1% | 6 | 120,000 |
| 12.6 | NaOH | Sodium oleate | 0.1% | 0 | 100 |
| 12.8 | NaOH | Sodium oleate | 0.1% | 0 | 50 |
| 13.0 | NaOH | Sodium oleate | 0.1% | 0 | 0 |

Sodium oleate alone: 0.1% (same as 7.8 pH above) 32,000.

| 7.0 | None | None | | 640,000 | 640,000 |
|---|---|---|---|---|---|
| 7.8 | None | Sodium resinate | 0.1% | 10,000 | 580,000 |
| 8.4 | Na$_2$HPO$_4$ | Sodium resinate | 0.1% | 5,000 | 520,000 |
| 8.8 | Na$_2$HPO$_4$ | Sodium resinate | 0.1% | 3,500 | 400,000 |
| 9.7 | Na$_2$HPO$_4$ and Na$_3$PO$_4$ | Sodium resinate | 0.1% | 1,500 | |
| 10.8 | Na$_2$HPO$_4$ and Na$_3$PO$_4$ | Sodium resinate | 0.1% | 1,000 | |
| 11.9 | Na$_3$PO$_4$ | Sodium resinate | 0.1% | 300 | 120,000 |
| 12.2 | Na$_3$PO$_4$ | Sodium resinate | 0.1% | 0 | |
| 12.6 | NaOH | Sodium resinate | 0.1% | 0 | 100 |

Sodium resinate alone: 0.1% (same as pH 7.8) 10,000.

The concentrates of sodium phosphate $Na_3PO_4.12H_2O$ and sodium hydroxide corresponding to the higher gauge values are as follows:

| Substance | Concentration | pH |
|---|---|---|
| $Na_3PO_4.12H_2O$ | 0.02% | 9.9 |
| Do | 0.20 | 10.9 |
| Do | 2.0 | 11.9 |
| Do | 10.0 | 12.6 |
| Do | 10.0+ | 12.8 |
| Do | 10.0+ | 13.0 |
| NaOH | 0.04% | 11.5 |
| Do | 0.40 | 12.75 |
| Do | 0.80 | 12.90 |
| Do | 1.20 | 13.0 |
| Do | 1.60 | 13.1 |

Table II

| pH | Soap used | Amount | Count |
|---|---|---|---|
| 11.9 | Sodium oleate | 0.0005% | 8,000 |
| 11.9 | Sodium oleate | .0050% | 600 |
| 11.9 | Sodium oleate | .0100% | 400 |
| 11.9 | Sodium oleate | .1000% | 6 |
| 11.9 | Sodium oleate | .2500% | 0 |
| 11.9 | Sodium oleate | .5000% | 0 |
| 11.9 | Sodium oleate | 2.5% | 0 |
| 11.9 | Sodium oleate | 5.0% | 0 |
| 11.9 | Sodium resinate | 0.0005% | 8,000 |
| 11.9 | Sodium resinate | .005% | 600 |
| 11.9 | Sodium resinate | .010% | 400 |
| 11.9 | Sodium resinate | .100% | 300 |
| 11.9 | Sodium resinate | .250% | 10 |
| 11.9 | Sodium resinate | .500% | 0 |
| 11.9 | Sodium resinate | 2.500% | 0 |
| 11.9 | Sodium resinate | 5.00% | 0 |

The upper section of Table 1 shows the results, using a soap of an unsaturated soap of a fatty acid, while the lower section shows the results, using a soap of an unsaturated non-fatty acid. For convenience, the results obtained by adding a fixed quantity of soap, to solutions of different alkaline concentration has been shown.

In Table II the alkaline concentration has been shown as remaining the same, while the amounts of soap have been varied. The tables based upon the findings of our experiments, clearly indicate that the addition of a small quantity of a soap of an unsaturated compound to a substance having a given degree of alkalinity will make that substance germicidal, when before it was not germicidal, or will increase its germicidal action.

Referring first to the upper section of Table I, showing the results when using sodium oleate, it will be seen that at 7 pH, when no soap is used, there is no reduction in count. It will further be noted that when the alkalinity was 7.8 and no soap was added, the count was 580,000. However upon the addition of 0.1% of sodium oleate, the count was immediately reduced to 32,000. Attention is particularly called to the result of adding 0.1% of sodium oleate to a compound having a pH of 11.9. As shown at the extreme right of the table, the count of the alkali alone was 120,000 while upon the addition of 0.1% of sodium oleate the count was reduced to 6, which may be considered a zero count.

The lower section of Table I relating to sodium resinate, shows substantially the same results. Here again it will be seen that a most pronounced increase in germicidal effect is produced, when using an alkalinity of 11.9 pH with 0.1% of sodium resinate, as compared with an alkali alone having a pH of 11.9, the count in this latter instance being 120,000 and corresponding in effect to that shown in the upper part of the table for sodium oleate.

Table II shows the effect of adding varying quantities respectively of sodium oleate and sodium resinate, to an alkaline compound having in this instance a pH of 11.9. Referring again to Table I it will be seen that the count resulting when a substance having a pH of 11.9 is used, is 120,000, a relatively high count. By referring to Table II it will be seen that the count is substantially immediately reduced by adding to a compound having a pH of 11.9, the small quantity of 0.0005% of sodium oleate. However, a zero count is obtained with .2500% of sodium oleate.

Another feature of this invention is the discovery that the germicidal efficiency of various alkaline substances can be increased by the addition of a substance containing a common ion, such as a salt of sodium, for example sodium chloride, added to one of the sodium phosphate-sodium oleate compounds, and further that the germicidal efficiency is decreased by adding a substance containing an uncommon ion, such as an ammonium salt, for example ammonium chloride, see Table III. Some commercial cleaners contain ammonium chloride together with an alkali. Thus the germicidal effect in these cleansers is decreased. By the practice of the invention herein the germicidal effect has been increased by adding the common ion instead of the uncommon ion (ammonium chloride) as above mentioned.

Table III

| pH | Soap used | Amount | Amount NaCl (common ion) | Count |
|---|---|---|---|---|
| 11.9 | Sodium oleate | 0.05% | None | 500 |
| 11.9 | Sodium oleate | 0.05% | 0.1% | 100 |
| 11.9 | Sodium oleate | 0.05% | 0.2% | 5 |
| 11.9 | Sodium oleate | 0.05% | 1.0% | 0 |
| 11.9 | Sodium oleate | 0.100% | None | 250 |
| 11.9 | Sodium oleate | 0.100% | 1.00% | 100 |
| 11.9 | Sodium oleate | 0.100% | 2.00% | 45 |
| 11.9 | Sodium resinate | 0.2% | None | 180 |
| 11.9 | Sodium resinate | 0.2% | 1.0% | 5 |
| 11.9 | Sodium resinate | 0.2% | 2.0% | 0 |

| pH | Soap used | Amount | Amount NH₄Cl (uncommon ion) | Count |
|---|---|---|---|---|
| 11.9 | Sodium oleate | 0.05% | 0.2% | 4000 |
| 11.9 | Sodium oleate | 0.05% | 0.1% | 1200 |

Table III shows the effect of the addition of a compound containing a common ion, to sodium-oleate and sodium-resinate-alkali combinations of this invention. By referring to the upper part of the table, it will be seen that when the substance containing the common ion is not used, the bacterial count is considerably higher. For example, compare the count in lines 1, 5 and 8 with lines 4, 7 and 10.

The lower part of the Table III indicates that the addition of a compound containing an uncommon ion does not reduce the bacterial count. For example, referring to the upper part of the table to line 2, including the alkali of a pH of 11.9 with 0.05% of sodium oleate, and 0.1% of a common-ion-containing compound gave a count of 100, while as shown in line 1 of the lower section of the table the same oleate-alkali combination with an addition of an uncommon-ion-containing substance gave a count of 4000.

It is evident that the addition of a certain quantity of unsaturated soap to an alkali of a given concentration has a decided effect in the matter of increasing the germicidal action, and that by the practice of this invention sterilization can be obtained at alkaline concentration much lower (and therefore at non-injurious concentrations) by the addition of a soap of an unsaturated compound, than can be obtained without the use of soap as herein specified. Moreover it is seen that two chemical substances of the classes herein mentioned, which are not germicidal when used alone, become highly germicidal when combined in the proper proportion, and these substances are highly useful for cleaning and sterilizing purposes. We have further found that an alkali in a certain concentration which will kill but a small percentage of harmful micro-organisms, can be made highly germicidal, and is efficient as a germicide at a temperature much lower than required when the unsaturated soap is not added.

It will be especially noted that the small quantities of the soaps alone are not germicidal, nor are the alkalies in certain concentrations germicidal. However, if two of these non-germicidal substances are brought together a highly germicidal substance results.

It will be understood that the intention is to claim herein that the alkaline concentration can be changed in almost any proportion, keeping the amount of soap constant, or that the amount of soap can be varied, while keeping the alkaline concentration constant, and thus compounds of varying germicidal efficiency can be produced. It must be obvious that the soap-alkali substances claimed herein are a decided improvement over either of the substances used alone, and it will be understood, and it is the intention to claim herein, the addition of other germicidal substances to any of the soap-alkali combinations.

Although we find that tri-sodium-phosphate is a very good alkali for the purposes herein, it is to be understood that any alkali may be used provided the proper concentration of alkali and soap are used. It is, therefore, intended to include other alkalies such as sodium carbonate, sodium hydroxide, and mixtures of any and all of these. Moreover it is intended to include mixtures containing sodium silicate or any other ingredients usable as a cleanser but which have little or no germicidal effect. Among commercial cleansers, one of which contains tri-sodium-phosphate with small amounts of sodium chloride, it was found that upon addition of a small amount of soap of an unsaturated fatty acid that the germicidal effect was decidedly increased.

It has further been found that the degree of alkalinity, as indicating the degree of germicidal action, is not dependable because germicidal effect or action varies with the substance. For example, sodium carbonate at 11.35 pH is more efficient than sodium phosphate at the same pH, and the phosphate is superior to the hydroxide. This shows that the pH is not a dependable index of germicidal action. But it is required that a dependable germicidal substance be had, which is usable commercially in uninjurious concentrations, and at substantially low temperatures, whereby rehandling, steaming (to obtain sterilization) and cooling is unnecessary. The present invention provides substances answering these requirements.

It has been found by us, that soaps of saturated compounds are not germicidal, and therefore we have also discovered a manner of differentiating between the soaps of saturated and unsaturated compounds, by noting the germicidal actions produced when used with alkalies. This is a feature of the invention.

The experimental work has shown that the activities of all the members of the unsaturated acid series of soaps obtain germicidal action substantially in the same way. Therefore, the use of all members of unsaturated series are claimed. The reaction, for purposes herein, of all members of the series are substantially the same, although action differs slightly depending upon the number of carbon atoms.

The acids of the unsaturated series differ from those of the saturated by containing one or more so-called unsaturated bonds. The saturated fatty acids have the general formula $C_nH_{2n}O_2$ and include, formic, acetic, propionic, caprylic, palmitic and stearic acids, etc. The unsaturated acids have the general formula $C_nH_{2n-2}O_2$ and contain one or more replaceable bonds. Included in this unsaturated series are acrylic ($CH_2=$ CH.COOH), crotonic, undecylenic, oleic, erucic, etc. In addition to the double unsaturated bond type there are other varying degrees of unsaturation in similar series with variation in the number of carbon atoms, such as the acids of the propiolic series $C_nH_{2n-4}O_2$, with two double bonds, and acids of the series $C_nH_{2n-6}O_2$ series with three double bonds.

Furthermore these double bond unsaturated compounds may include so-called substituted compounds. For example taking only one of the original oleic acid series having the number of carbon atoms constant, and showing varying degrees of unsaturation and substitution; stearic acid (saturated)

$CH_3.CH_2CH_2CH_2CH_2CH_2CH_2CH_2CH_2CH_2$ $CH_2CH_2CH_2CH_2CH_2CH_2CH_2.COOH$; oleic acid (unsaturated) $CH_3.CH_2CH_2CH_2CH_2$ $CH_2CH_2CH_2CH=CHCH_2CH_2CH_2CH_2CH_2$ $CH_2CH_2.COOH$; Ricinoleic acid (unsaturated substituted) $CH_3.CH_2CH_2CH_2CH_2CH_2$ $CH_2CH(OH)$ $CH_2CH=CH_2CH_2CH_2CH_2$ $CH_2CH_2CH_2.COOH$.

Acids like stearic, of the saturated series, might also be substituted and form such compound as di-hydroxy-stearic acid, which would still be a saturated acid. Substitution of the type described does not affect the double bond.

Other unsaturated compounds include (taking for example one type having a definite number of carbon atoms):

| | | | |
|---|---|---|---|
| $C_nH_{2n}O_2$ | Stearic acid | $(C_{18}H_{36}O_2)$ | Saturated. With mono, di etc. hydroxy stearic acids. |
| $C_nH_{2n-2}O_2$ | Oleic acid | $(C_{18}H_{34}O_2)$ | Unsaturated; one double bond. With substituted acids as ricinoleic. |
| $C_nH_{2n-4}O_2$ | Linolic acid | $(C_{18}H_{32}O_2)$ | Unsaturated; two double bonds. With substituted acids. |
| $C_nH_{2n-6}O_2$ | Linolenic acid. | $(C_{18}H_{30}O_2)$ | Unsaturated; three double bonds with substituted acids. |

Inasmuch as the members of any organic series of compounds ordinarily have the same general properties, it is the intention herein to claim the germicidal substances resulting from the addition of soaps of any of the unsaturated compounds above mentioned, and of equivalent compounds, to alkaline substances of varying concentrations.

The series above mentioned are the so-called fatty acids (saturated and unsaturated, both substituted). They are members of the aliphatic compounds, as distinguished from the aromatic. The former are the "straight-chain" derivatives while the latter are "cyclic" or "ring" compounds. However, unsaturated compounds also exist in the aromatic series as well as in the aliphatic. Rosin (which has been experimented with herein) is a compound of this type (aromatic) and is distinctly different in composition from the above described "unsaturated fatty acids". The chief component of rosin is a cyclic ring which contains double bonds.

Experimental work shows that all members of the series of unsaturated fatty acid soaps produced similar results when added in small quantities to alkali compounds.

It has been found that by the use of two specific soaps slightly better results are obtained, although other soaps of generally like nature will also produce the desired result. Among the soaps specifically claimed, are the sodium soap of oleic acid, sodium oleate, and the sodium soap of resin, sodium resinate. Sodium oleate and sodium resinate have been found particularly efficient in combination with tri-sodium phosphate and with a mixture of tri-sodium and mono-sodium phosphates. It will be further noted that a sodium phosphate solution of given pH can be used, and that its germicidal action can be obtained or decidedly increased by adding a soap of an unsaturated carbon compound, or that a soap of a certain pH can be selected, and that the germicidal action can be obtained or can be decidedly increased by adding sodium phosphate. Although it has been found that all of the soaps of the unsaturated acids operate in the manner set forth, yet sodium oleate and sodium resinate manifest the desired properties in a degree particularly applicable to the uses herein.

It is obvious that the soap-alkali compositions herein disclosed, have decided advantages over the uses of either soaps or alkalies separately in that to have the proper cleansing and germicidal effect these soaps or alkalies must be used in concentrations, and at temperatures, and over periods of time, which make their use economically disadvantageous.

The intention is to include specifically the following substances: under alkalies: alkali phosphates, (mono, di, and tri phosphates); alkali carbonates (mono-, di- and sesquicarbonates); alkali hydroxides; alkali to include the sodium, potassium, ammonium, and lithium salts; any of these alone or in combinations; and with and without other ingredients added, such as ammonium chloride, etc., to increase the cleansing capacities of the alkali.

Under soaps: Sodium, ammonium, potassium, or lithium soaps (all alkaline soaps). All members of the unsaturated fatty acid series, alone or mixed. Rosin soaps. Oleates, linoleates, ricinoleates, etc.

Compositions of soap and alkali as stated above alone or together with the addition of any other substance which will increase the germicidal power, as $CuSO_4$, $HgCl_2$, phenol, cresol, thymol, naphthol, resorcin, essential oils, chlorine compounds, sodium perborate, etc.

The use of the above various compounds to kill bacteria and other micro-organisms in general. The use of these to kill specific organisms such as *B. coli, B. typhi, Strep. lacticus, Staph. Aureus*, Tubercule B., etc.

We claim as our invention:

1. A composition of matter comprising an alkali soap of an unsaturated soap forming acid and an alkaline reacting substance in such proportions that an aqueous solution thereof shall have a pH value between 10 and about 12.6 when the concentration of soap in such solution is 0.1%.

2. A composition of matter comprising an alkali soap of an unsaturated soap forming acid and an alkaline reacting alkali salt in such proportions that an aqueous solution thereof shall have a pH value between 10 and about 12.6 when the concentration of soap in such solution is 0.1%.

3. A composition of matter comprising an alkali soap of an unsaturated soap forming acid and an alkali hydroxide in such proportions that an aqueous solution thereof shall have a pH value between about 10 and about 12.6 when the concentration of soap in such solution is 0.1%.

4. A composition of matter comprising an alkali resinate and an alkaline reacting substance in such proportions that an aqueous solution thereof shall have a pH value between about 10 and 12.6 when the concentration of soap in such solution is 0.1%.

5. A composition of matter comprising an alkali oleate and an alkaline reacting substance in such proportions that an aqueous solution thereof shall have a pH value between about 10 and about 12.6 when the concentration of soap in such solution is 0.1%.

6. A composition of matter comprising an alkali soap of an unsaturated soap forming acid and an alkaline reacting substance in the proportions of about five parts of soap to between 2 and 100 parts of said alkaline reacting substance.

7. A composition of matter comprising an alkaline soap of an unsaturated soap forming acid and an alkali hydroxide in the proportions of about ten parts of soap to between 1 and 40 parts of alkali hydroxide.

In witness whereof, we have hereunto set our hands this fifth day of October 1928.

ARTHUR R. CADE.
HALVOR O. HALVORSON.